US012537643B2

(12) United States Patent
Liang

(10) Patent No.: US 12,537,643 B2
(45) Date of Patent: Jan. 27, 2026

(54) DETECTING AND STATUS REPORTING SYSTEM AND METHOD THEREOF

(71) Applicant: LEOTEK CORPORATION, Taipei (TW)

(72) Inventor: Kai-Chun Liang, Taipei (TW)

(73) Assignee: LEOTEK CORPORATION, Taipei (TW)

( * ) Notice: Subject to any disclaimer, the term of this patent is extended or adjusted under 35 U.S.C. 154(b) by 373 days.

(21) Appl. No.: 18/127,665

(22) Filed: Mar. 29, 2023

(65) Prior Publication Data

US 2024/0305420 A1 Sep. 12, 2024

(30) Foreign Application Priority Data

Mar. 10, 2023 (TW) .................................. 112108889

(51) Int. Cl.
*H04L 5/00* (2006.01)
*H04L 67/12* (2022.01)
*H04W 72/23* (2023.01)

(52) U.S. Cl.
CPC ............ *H04L 5/0048* (2013.01); *H04L 67/12* (2013.01); *H04W 72/23* (2023.01)

(58) Field of Classification Search
CPC ....... H04L 5/0048; H04L 67/12; H04W 72/23
See application file for complete search history.

(56) References Cited

U.S. PATENT DOCUMENTS

| 11,659,025 | B2* | 5/2023 | Po .......................... H04L 67/125 709/226 |
| 2019/0124590 | A1* | 4/2019 | Chiang ............... H04L 12/2809 |
| 2022/0191271 | A1 | 6/2022 | Po |

FOREIGN PATENT DOCUMENTS

| CN | 114340040 A | * | 4/2022 |
| TW | 763173 B | | 5/2022 |

OTHER PUBLICATIONS

Taiwan Office Action corresponding to Application No. 112108889, on Jun. 30, 2023, 8 pages.

* cited by examiner

*Primary Examiner* — Cheikh T Ndiaye
(74) *Attorney, Agent, or Firm* — Innovation Counsel LLP

(57) ABSTRACT

A detecting and status reporting system, includes a first control device and at least one second control device. The first control device sends a first message to a remote device through a first communication link. The first communication specification of the first communication link is LPWAN (Low-Power Wide-Area Network). The at least one second control device communicates with the remote device through the first communication link, and communicates with the first control device through a second communication link. The second communication specification of the second communication link is LR-WPANs (Low-Rate Wireless Personal Area Networks). When the first communication link of the first control device is abnormal, the first control device sends the first message to the at least one second control device through the second communication link, and sends the first message to the remote device through the first communication link of the at least one second control device.

24 Claims, 9 Drawing Sheets

DETECTING AND STATUS REPORTING SYSTEM AND METHOD THEREOF

This application claims the benefit of Taiwan application Serial No. 112108889, filed Mar. 10, 2023, the subject matter of which is incorporated herein by reference.

TECHNICAL FIELD

The disclosure is related to a system and a method for detecting and status reporting, and particularly related to a system and a method for automatically detecting and status reporting with dual-modes.

BACKGROUND

In order to maintain an electronic device in a normal operating status, the electronic device has to be equipped with a function of automatically detecting and status reporting, so as to detect an abnormal status, and report the abnormal status to the backstage server. When the electronic device only relies on a single-mode communication link for detecting and status reporting, if the single-mode communication link is abnormal, the abnormal status may not be transmitted to the backstage server. Moreover, the backstage server may not immediately issue a command to the electronic device so as to reboot the electronic device to recover the abnormal state.

In view of the above-mentioned technical problems, it is necessary to adopt a dual-mode communication link to perform automatically detecting and status reporting. When communication link of one mode (out of the dual-mode) is abnormal, the communication link of the other mode may be used to perform automatically detecting and status reporting, which may reinforce the low connection rate of the single-mode communication link.

SUMMARY

According to an aspect of the present disclosure, a detecting and status reporting system is provided. The detecting and status reporting system includes the following elements. A first control device for transmitting a first message to a remote device through a first communication link, and reporting an operating status of the first control device according to the first message, wherein the first communication link has a first communication specification, the first communication specification is LPWAN (Low-Power Wide-Area Network). At least one second control device for communicating with the remote device through the first communication link, and communicating with the first control device through a second communication link, wherein the second communication link has a second communication specification, the second communication specification is LR-WPANs (Low-Rate Wireless Personal Area Networks), and the second communication specification is different from the first communication specification. When the first communication link of the first control device is abnormal, the first control device transmits the first message to the at least one second control device through the second communication link, and transmits the first message to the remote device through the first communication link of the at least one second control device to report the operating status of the first control device.

According to an aspect of the present disclosure, a detecting and status reporting method is provided. The detecting and status reporting method includes the following steps. Transmitting a first message to a remote device through a first communication link of a first control device, wherein the first communication link has a first communication specification, and the first communication specification is LPWAN (Low-Power Wide-Area Network). Reporting an operating status of the first control device according to the first message. Communicating with the remote device through the first communication link of at least one second control device. Communicating with the first control device through a second communication link of the at least one second control device, wherein the second communication link has a second communication specification, and the second communication specification is LR-WPANs (Low-Rate Wireless Personal Area Networks), and the second communication specification is different from the first communication specification. When the first communication link of the first control device is abnormal, performing the following steps. Transmitting the first message to the at least one second control device through the second communication link of the first control device. Transmitting the first message to the remote device through the first communication link of the at least one second control device to report the operating status of the first control device.

Figure 1:
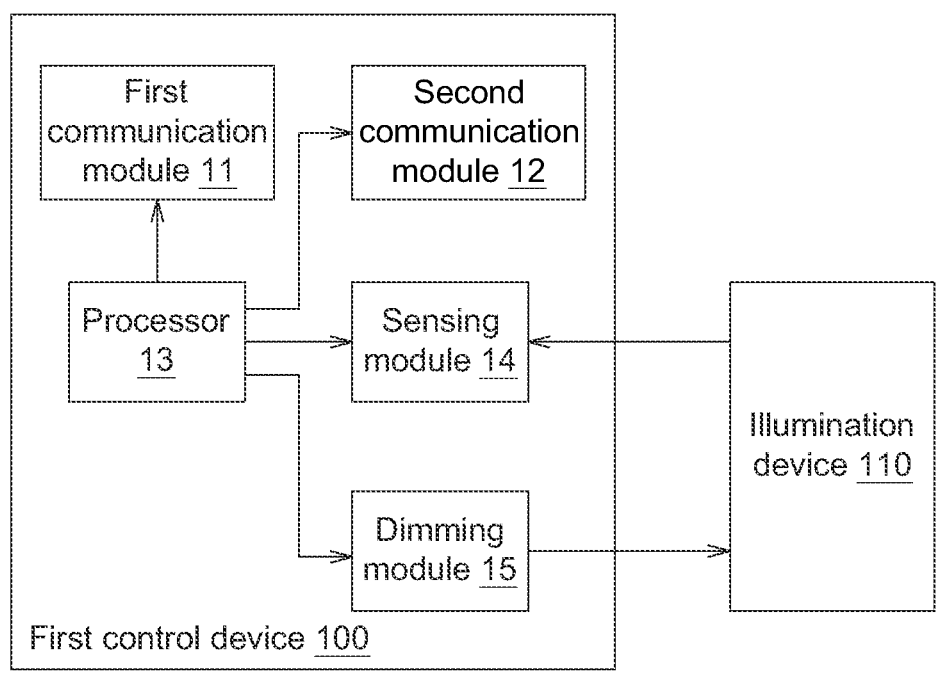
FIG. 1 is a functional block diagram of a first control device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1 is a functional block diagram of a first control device 100 according to an embodiment of the disclosure. The first control device 100 includes a first communication module 11, a second communication module 12, a processor 13, a sensing module 14 and a dimming module 15. The first control device 100 is coupled to an illumination device 110, and the illumination device 110 is for example, but not limited to, a smart street lamp. The first control device 100 is used for controlling the operation of the illumination device 110 and adjusting parameters of the illumination device 110. The parameters of the illumination device 110 include, but not limited to: a brightness, a current and a power factor of the illumination device 110.

Moreover, the first control device 100 may detect an operating status of the illumination device 110 and/or an operating status of the first control device 100 itself, and report the operating status to a remote device (not shown in FIG. 1). The first control device 100 may operate in a dual-mode to perform detecting and status reporting. The dual-mode includes a first mode and a second mode.

The first communication module 11 is a communication circuit capable of performing wired communication and/or wireless communication, and the first communication module 11 is used to establish a first communication link C1 in the first mode. The first communication link C1 has a first communication specification, and the first communication link C1 performs communication according to the first communication specification. The first communication specification is LPWAN (Low-Power Wide-Area Network). In one example, the first communication specification is "NB-IoT (Narrow Band Internet of Things)" with a low transmission rate, which is an LPWAN wireless communication specification used in the IoT. In another example, the first communication specification is "CAT-M1 (Category M1)" with a medium transmission rate, also known as "eMTC", which is used in real-time, high-speed and delay-sensitive applications.

The second communication module 12 is similar to the first communication module 11, the second communication module 12 is a communication circuit capable of performing wired communication and/or wireless communication, and the second communication module 12 is used to establish a second communication link C2 in the second mode. The second communication link C2 has a second communication specification, and the second communication link C2 performs communication according to the second communication specification. The second communication specification is different from the first communication specification, and the second communication specification is LR-WPANs (Low-Rate Wireless Personal Area Networks). In one example, the second communication specification is "XBEE3 DigiMesh" with low transmission rate and short transmission distance, which is used in applications of low transmission rate and low power consumption.

The sensing module 14 is coupled to the illumination device 110, and the sensing module 14 is used to sense parameters of the illumination device 110 (including: the brightness, the current and the power factor of the illumination device 110, etc.). The dimming module 15 is coupled to the illumination device 110, and the dimming module 15 is used to adjust the brightness of the illumination device 110.

The processor 13 is coupled to the first communication module 11, the second communication module 12, the sensing module 14 and the dimming module 15. The processor 13 is, for example, a central processing unit (CPU), a microprocessor (MCU) or a digital signal processor (DSP). The processor 13 is used to coordinate operations of the first communication module 11, the second communication module 12, the sensing module 14 and the dimming module 15.

Figure 2A:
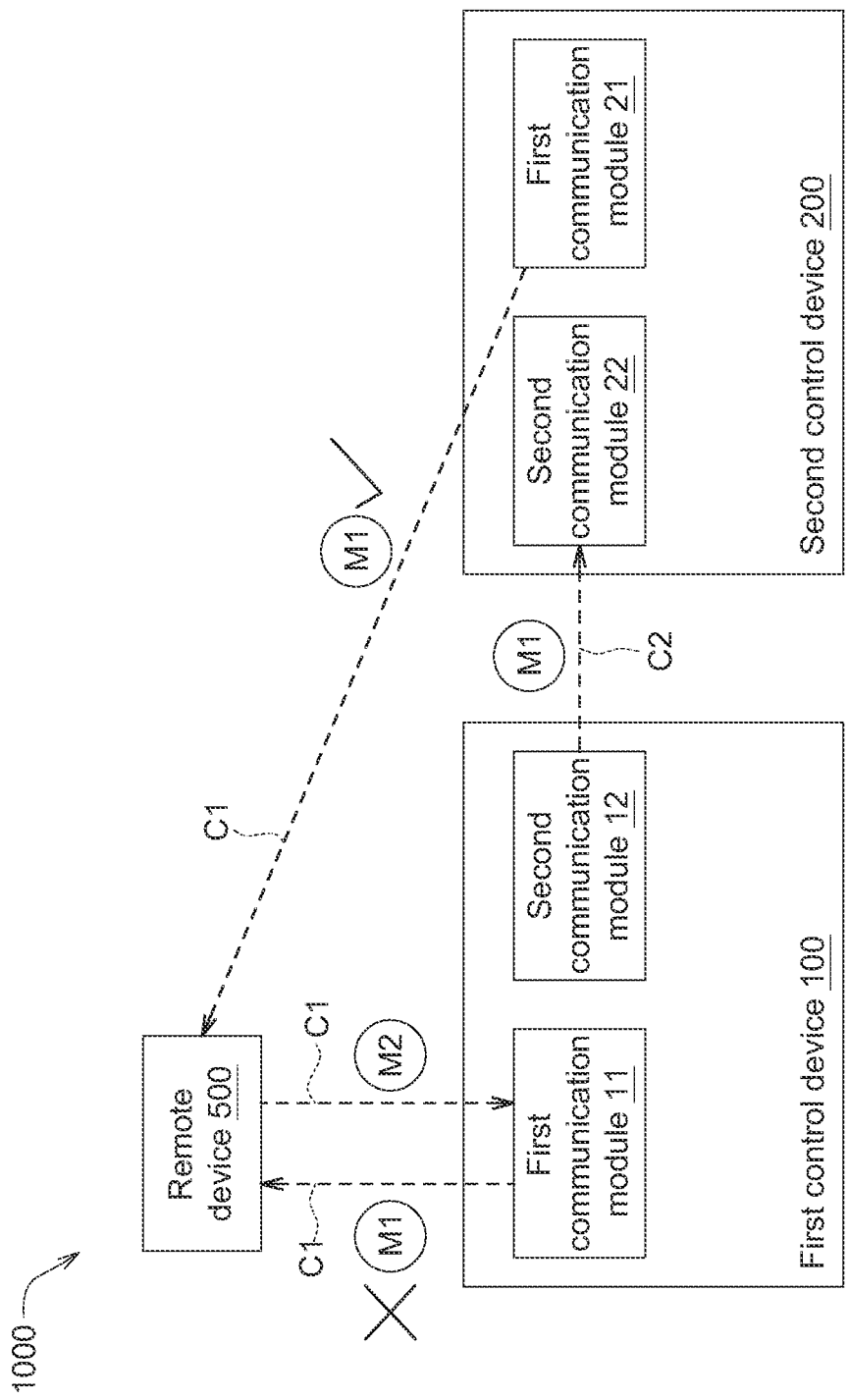
FIG. 2A is a schematic diagram of an embodiment of operation of the detecting and status reporting system of the disclosure.
Figure 3A:
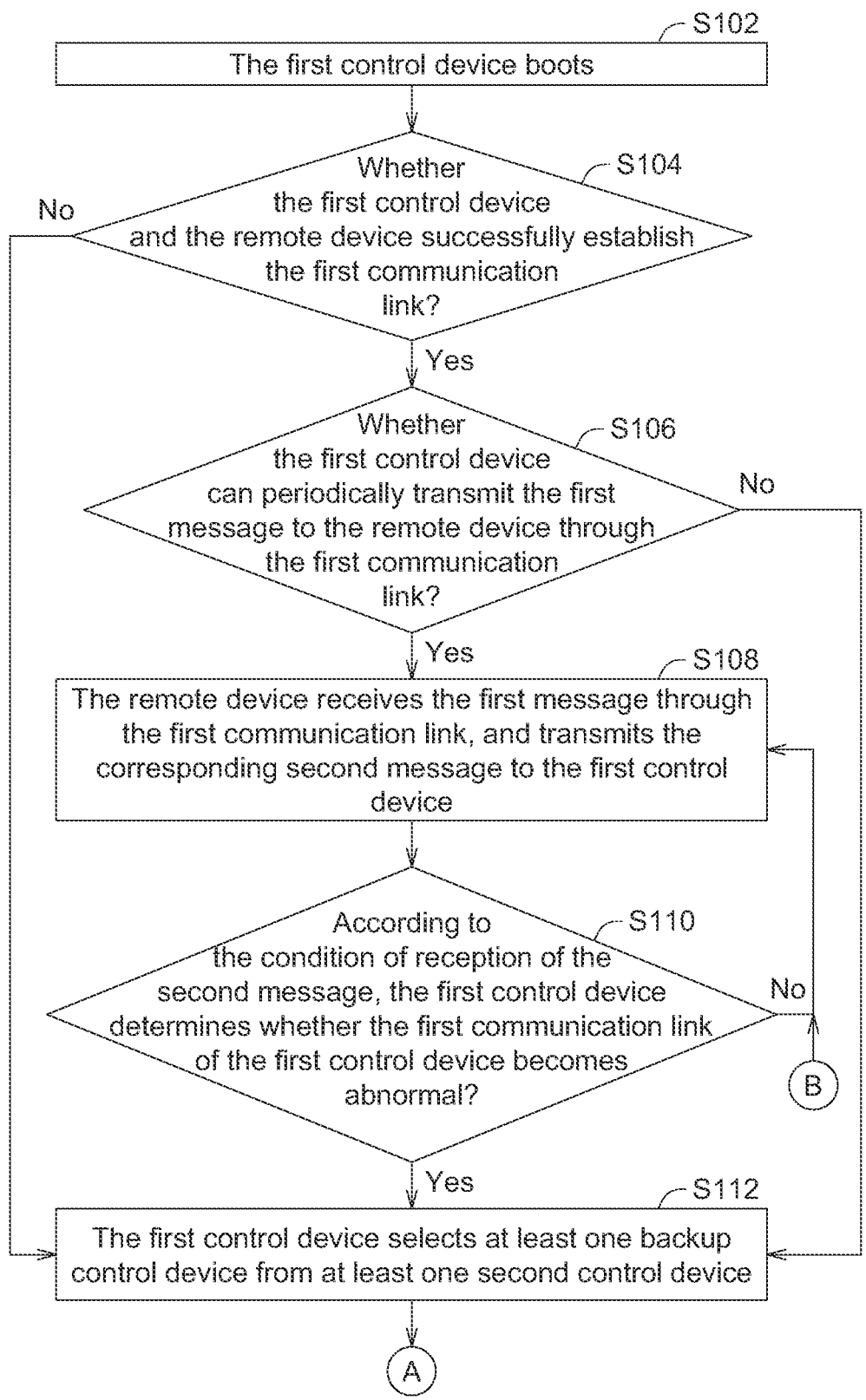
FIGS. 3A and 3B are flow charts of an embodiment of the detecting and status reporting method of the disclosure.
Figure 3B:
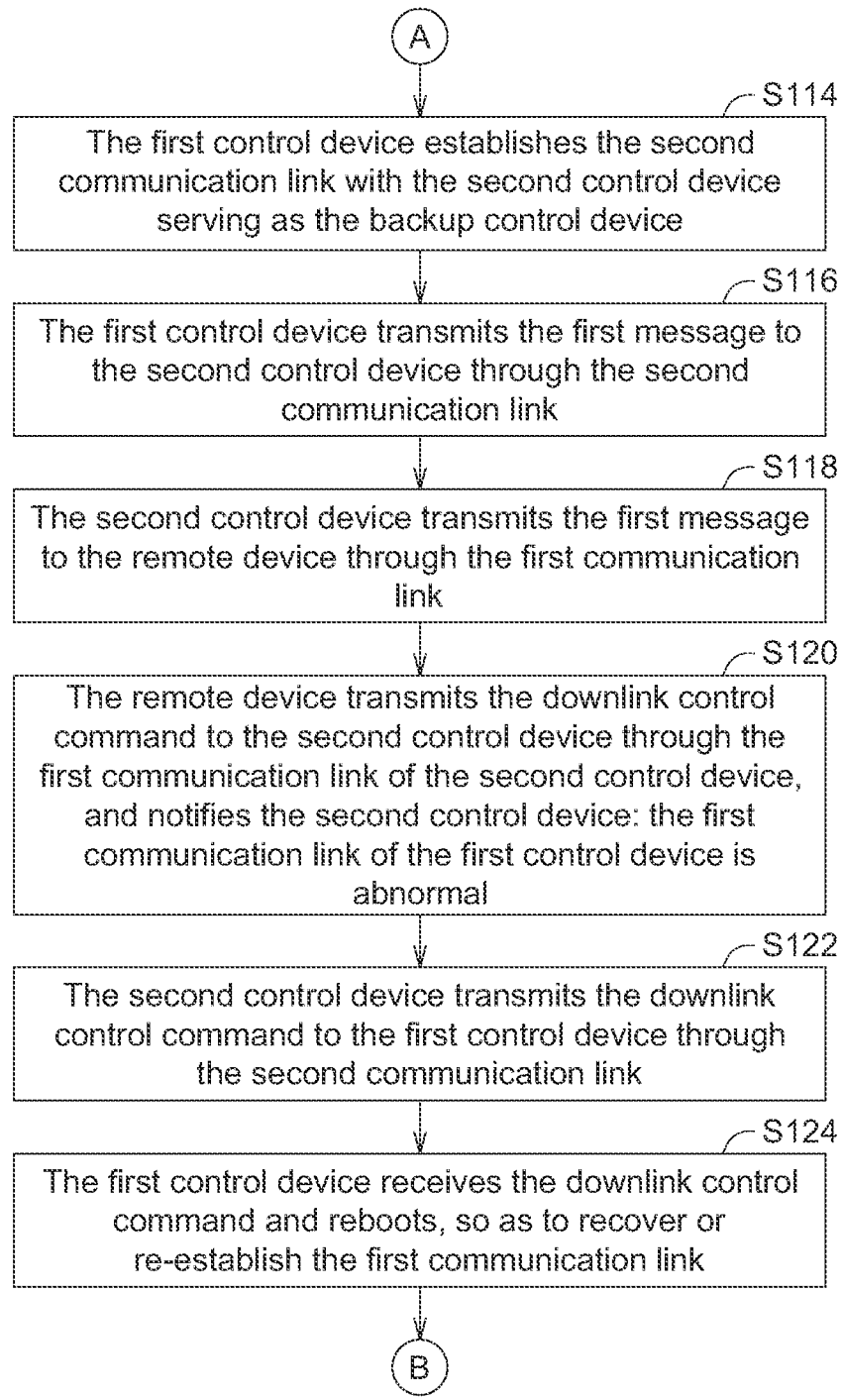

FIG. 2A is a schematic diagram of an embodiment of operation of the detecting and status reporting system 1000 of the disclosure. FIGS. 3A and 3B are flow charts of an embodiment of the detecting and status reporting method of the disclosure. First, please refer to FIG. 2A, the detecting and status reporting system 1000 includes a first control device 100 and at least one second control device (the embodiment of FIG. 2A only shows one second control device 200). The first control device 100 and the second control device 200 perform status reporting the status to the remote device 500 in an uplink direction, so as to report the operating status of the first control device 100 or the second control device 200. The remote device 500 is, for example, a backstage server disposed in the cloud.

Next, please refer to FIGS. 2A and 3A, to describe operation of the detecting and status reporting system 1000. First, in step S102, the first control device 100 boots. Then, in step S104, the first communication link C1 is established with the remote device 500 by the first communication module 11 of the first control device 100, and it is determined whether the first communication link C1 is successfully established. If it is determined in step S104 that the first communication link C1 is successfully established, then executing step S106: the first control device 100 operates in the first mode to perform the operation of the first communication link C1, and determines whether the first message M1 can be periodically transmitted to the remote device 500 through the first communication link C1. The first message M1 is, for example, a "REPORT" message, and the operating status of the first control device 100 may be reported according to the first message M1. Moreover, the first message M1 is periodically transmitted to the remote device 500 in a first period P1. The first period P1 is, for example, 20 minutes.

In step S106, if it is determined that the first control device 100 can periodically transmit the first message M1 to the remote device 500 through the first communication link C1, it indicates that the first communication link C1 of the first control device 100 continuously keeps in normal operation, then proceeding to step S108: the remote device 500 receives the first message M1 through the first communication link C1, and transmits a corresponding second message M2 to the first control device 100 as a response, through the first communication link C1. The second message M2 is, for example, an "ACK" message.

After step S108, then executing step S110: the first control device 100 determines whether the first communication link C1 of the first control device 100 becomes abnormal, according to the status of reception of the second message M2. For example, if the first control device 100 has received second messages M2 with a total number of N. However, after receiving the N-th second message M2 and the predefined duration T1 has elapsed, the first control device 100 has not yet received the (N+1)-th second message M2, then, the first control device 100 determines that the first communication link C1 becomes abnormal (that is, although the first communication link C1 is established successfully and the first communication link C1 has operated normally for a period of time, but the first communication link C1 becomes abnormal during the subsequent operation). The predefined duration T1 for receiving the second message M2 is related to the first period P1 for transmitting the first message M1. For example, when the first period P1 is 20 minutes, the predefined duration T1 is, e.g., 5 minutes.

In step S110, if it is determined that the first communication link C1 of the first control device 100 is in normal operation, then return to step S108: the remote device 500 receives the first message M1 through the first communication link C1 and transmits the corresponding second message M2 to the first control device 100 as a response.

On the other hand, if it is determined in step S110 that the first communication link C1 of the first control device 100 becomes abnormal, then executing subsequent steps S112 to S118: transmitting the first message M1 to the remote device 500, by the second control device 200. Similarly, if it is determined in step S104, as mentioned above, the establishment of the first communication link C1 of the first control device 100 fails, also executing subsequent steps S112 to S118. Moreover, if it is determined in the step S106, as mentioned above, the first control device 100 may not periodically transmit the first message M1 to the remote device 500, it indicates that the first communication link C1 of the first control device 100 is abnormal, also executing subsequent steps S112 to S118.

In step S112, the first control device 100 selects at least one backup control device from at least one second control device. In the embodiment shown in FIG. 2A, the number of backup control devices is "1", and the first control device 100 selects an adjacent second control device 200 as an backup control device. The second control device 200 is similar to the first control device 100. The second control device 200 also includes a first communication module 21 and a second communication module 22. The second control device 200 is coupled to another illumination device (not shown in FIG. 2A).

Next, please refer to FIGS. 2A and 3B, subsequent to step S112, executing step S114: the first control device 100 operates in the second mode and establishes a second communication link C2 with the second communication module 22 of the second control device 200 serving as the backup control device, through the second communication module 12 of the first control device 100.

Then, executing step S116: the first control device 100 transmits the first message M1 to the second control device 200 through the second communication link C2. According to the first message M1, the second control device 200 knows that, the first communication link C1 between the first control device 100 and the remote device 500 is abnormal.

Then, executing step S118: the second control device 200 establishes the first communication link C1 through the first communication module 21 so as to communicate with the remote device 500, and the second control device 200 transmits the first message M1 to the remote device 500 through the first communication link C1. The second control device 200 reports the operating status of the first control device 100 to the remote device 500 according to the first message M1.

After the remote device 500 receives the first message M1 sent by the second control device 200, the remote device 500 knows that the first communication link C1 of the first control device 100 is abnormal, and then executing steps S120 to S124: The remote device 500 transmits a downlink control command M0 in a downlink direction, so as to cause the first control device 100 to reboot. The implementation of step S120 to S124 will be described in the following paragraphs.

Figure 2B:
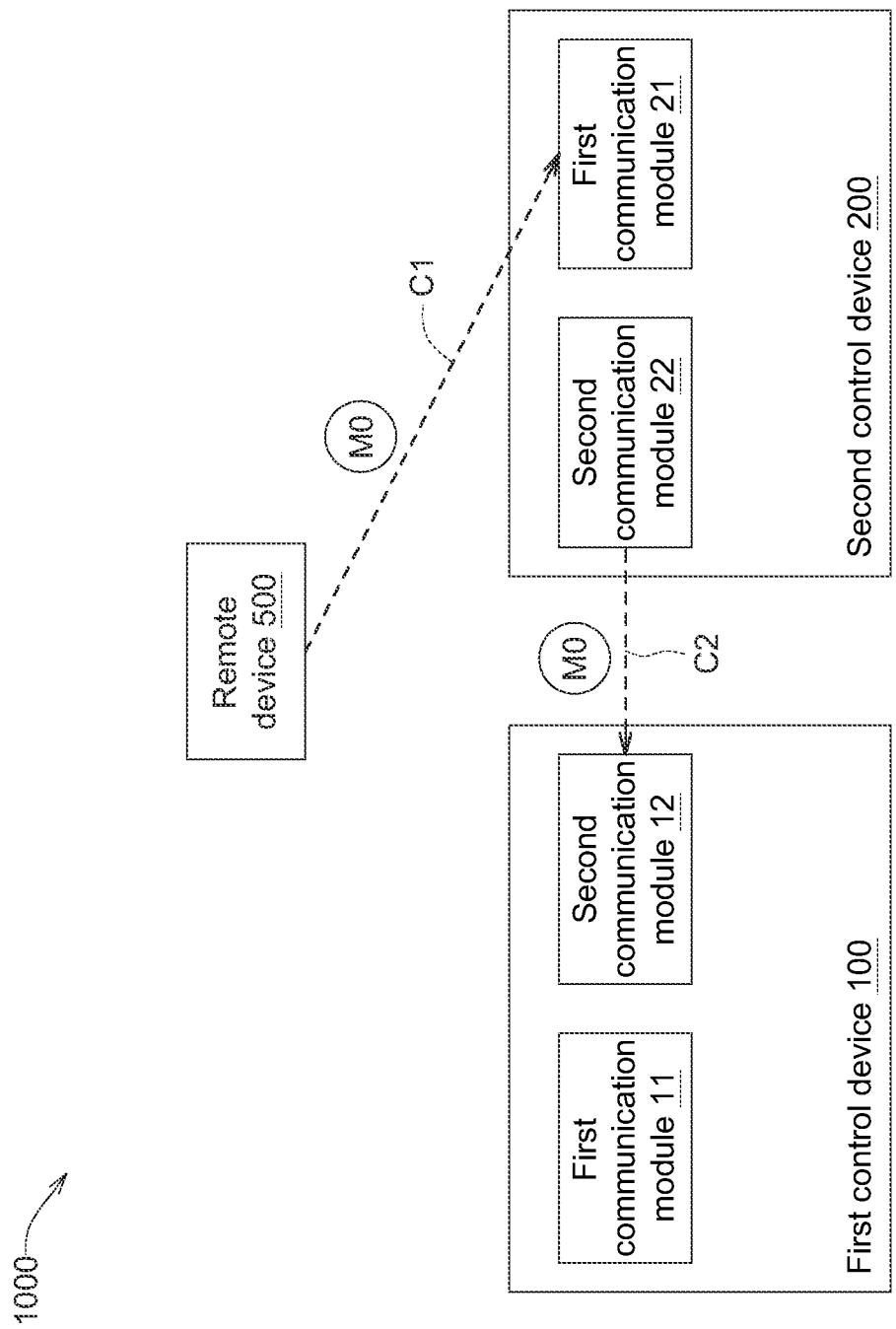
FIG. 2B is a schematic diagram illustrating the remote device transmitting the downlink control command in the downlink direction.

FIG. 2B is a schematic diagram illustrating the remote device 500 transmitting the downlink control command M0 in the downlink direction. Please refer to FIGS. 2B and 3B. In step S120, the remote device 500 transmits a downlink control command M0 to the second control device 200 through the first communication link C1 of the second control device 200, and notifies the second control device 200 that, the first communication link C1 of the first control device 100 is abnormal. The downlink control command M0 is, for example, a "RESET" command, which is used to instruct the first control device 100 to reboot.

Then, executing step S122: the second control device 200 transmits the downlink control command M0 to the first control device 100 through the second communication link C2.

Then, executing step S124: the first control device 100 receives the downlink control command M0 and reboots, causing the first communication module 11 of the first control device 100 to recover the first communication link C1 or re-establish the first communication link C1.

Then, returning to step S108, the remote device 500 receives the first message M1 through the recovered or re-established first communication link C1, and transmits the corresponding second message M2 to the first control device 100 through the first communication link C1 as a response.

Figure 4:
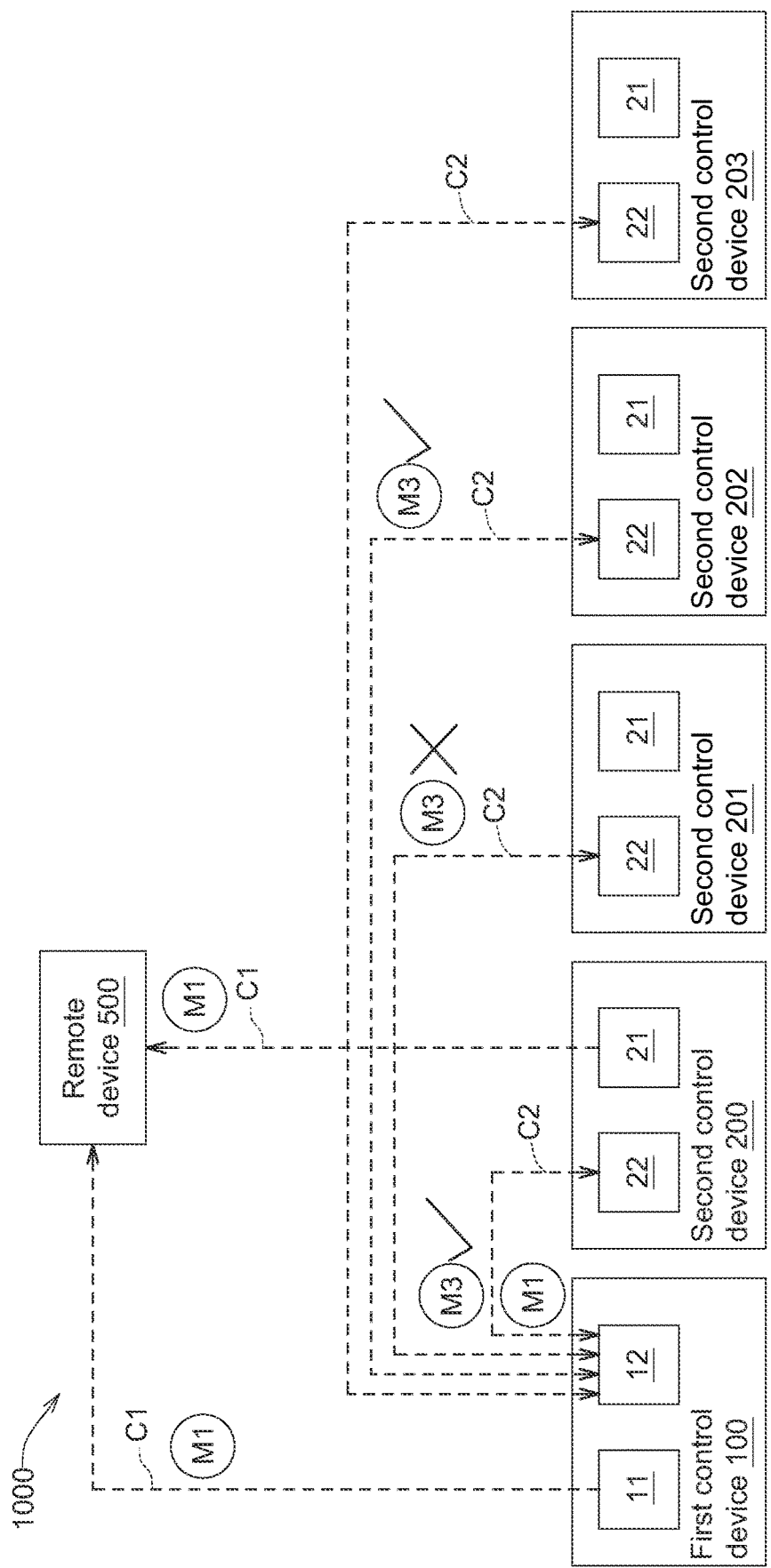
FIG. 4 is a schematic diagram illustrating another embodiment of operation of the detecting and status reporting system of the disclosure.

FIG. 4 is a schematic diagram illustrating another embodiment of operation of the detecting and status reporting system 1000 of the disclosure. Compared with the embodiment in FIG. 2A, the embodiment in FIG. 4 shows a plurality of second control devices 200, 201, 202 and 203, and the first control device 100 selects at least one backup control device from these second control devices 200-203. The second communication module 12 of the first control device 100 may sense the signal strength of respective second communication links C2 of the second control devices 200-203, and select at least one backup control device according to the higher signal strength. In the embodiment shown in FIG. 4, the first control device 100 selects three second control devices 200, 201 and 202 with higher signal strengths, as backup control devices (that is, the number of backup control devices is "3"). In other examples, the number of backup control devices may also be other positive integers, such as "1", "2", "4" or "5", etc.

Figure 3C:
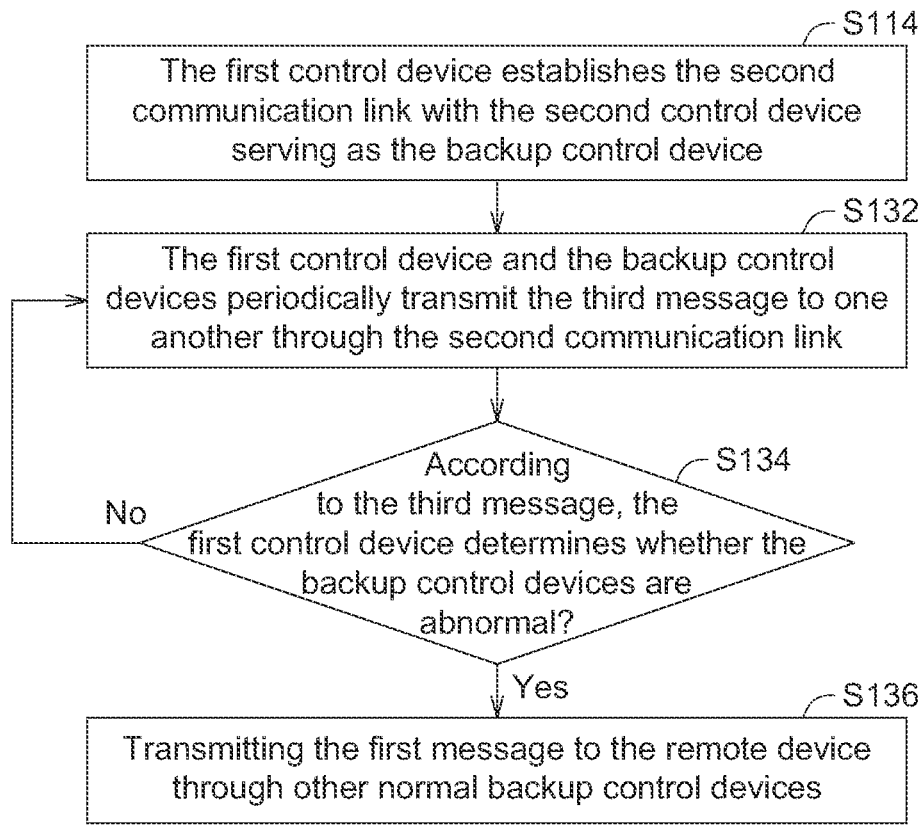
FIG. 3C is a flow chart of another embodiment of the detecting and status reporting method of the disclosure.

FIG. 3C is a flow chart of another embodiment of the detecting and status reporting method of the disclosure. The method flow in FIG. 3C may be implemented in conjunction with the embodiment of FIG. 4, and step S132 in FIG. 3C may be executed subsequent to the step S114 in FIG. 3B. Please refer to FIG. 4 and FIG. 3C, in step S132, the first control device 100 and the backup control devices (i.e., the second control device 200, 201 and 202) periodically transmit the third message M3 to one another periodically, through the second communication link C2. The third message M3 is, for example, an "XBEE3 STATE" message, and the third message M3 indicates respective operating states of the backup control devices.

Then, executing step S134: the first control device 100 periodically checks the operating status of the backup control device according to the third message M3, and determines whether the backup control device is abnormal. When one of the backup control devices does not transmit the third message M3, it is determined that the backup control device is abnormal. For example, the second control device 201 among the backup control devices does not transmit the third message M3, and it is determined that the second control device 201 is abnormal.

If it is determined in step S134 that one of the backup control devices is abnormal, then executing step S136: transmit the first message M1 to the remote device 500 through other normal backup control devices, reporting to the backup control device that one of the backup control devices is abnormal. For example, when the second control device 201 is determined as abnormal, the first message M1 is transmitted to the remote device 500 through the first communication link C1 of another normal backup control device (i.e., normal second control device 200 or normal second control device 202), reporting that the second control device 201 is abnormal, according to the first message M1. In one example, the first control device 100 transmits the first message M1 to the second control device 200 through the second communication link C2, and then the second control device 200 transmits the lii first message M1 to the remote device 500 through the first communication link C1. In another example, the first message M1 may also be sent to the remote device 500 through a communication link C1 of the first control device 100, reporting the second control device 201 as abnormal, according to the first message M1.

If it is determined in step 3134 that each of the backup control devices is normal, then return to step 3132: the first control device 100 and these backup control devices periodically transmit the third message M3 to one another through the second communication link C2.

Figure 5:
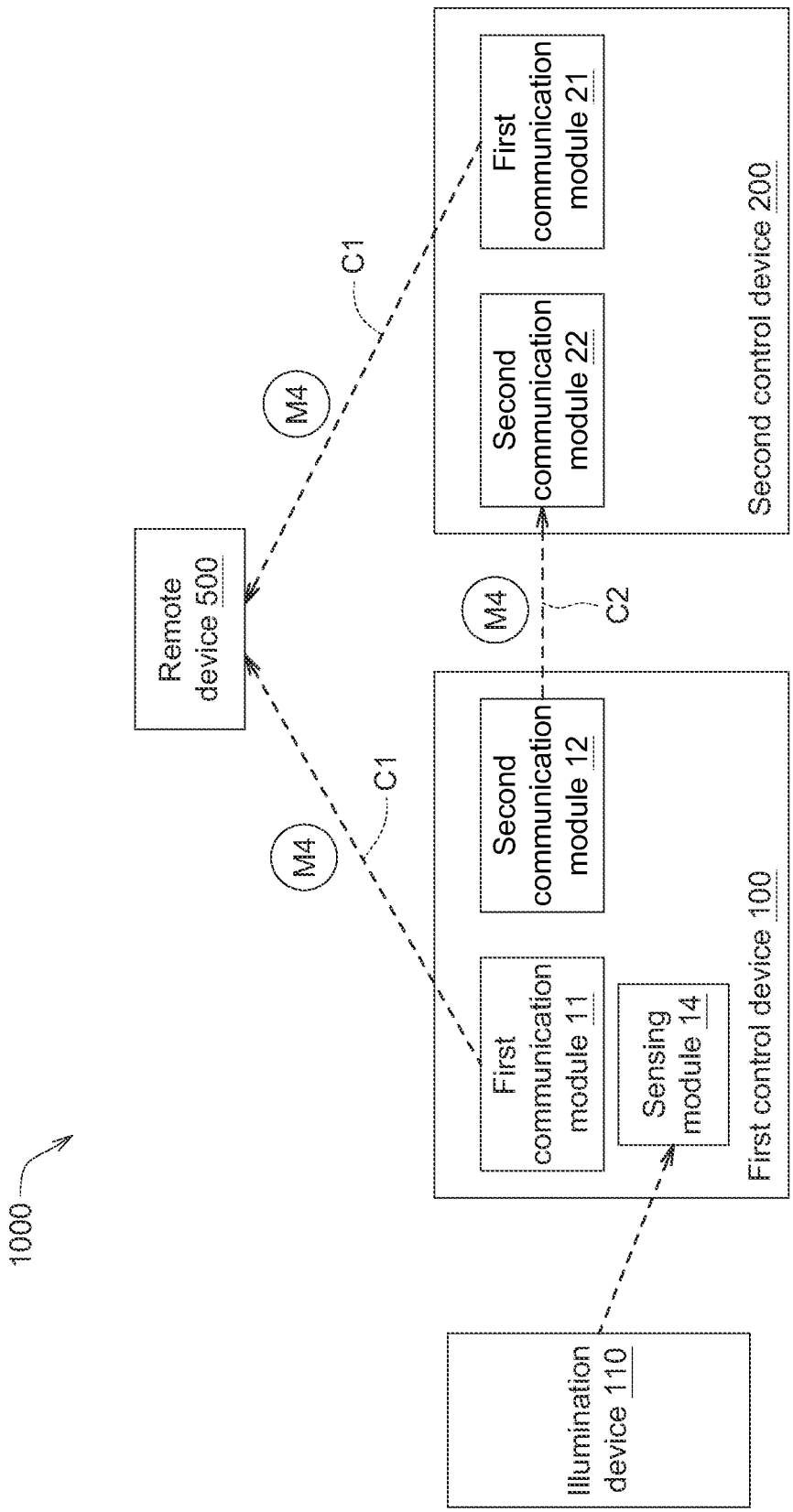
FIG. 5 is a schematic diagram illustrating detection and status reporting of the illumination device.
Figure 6:
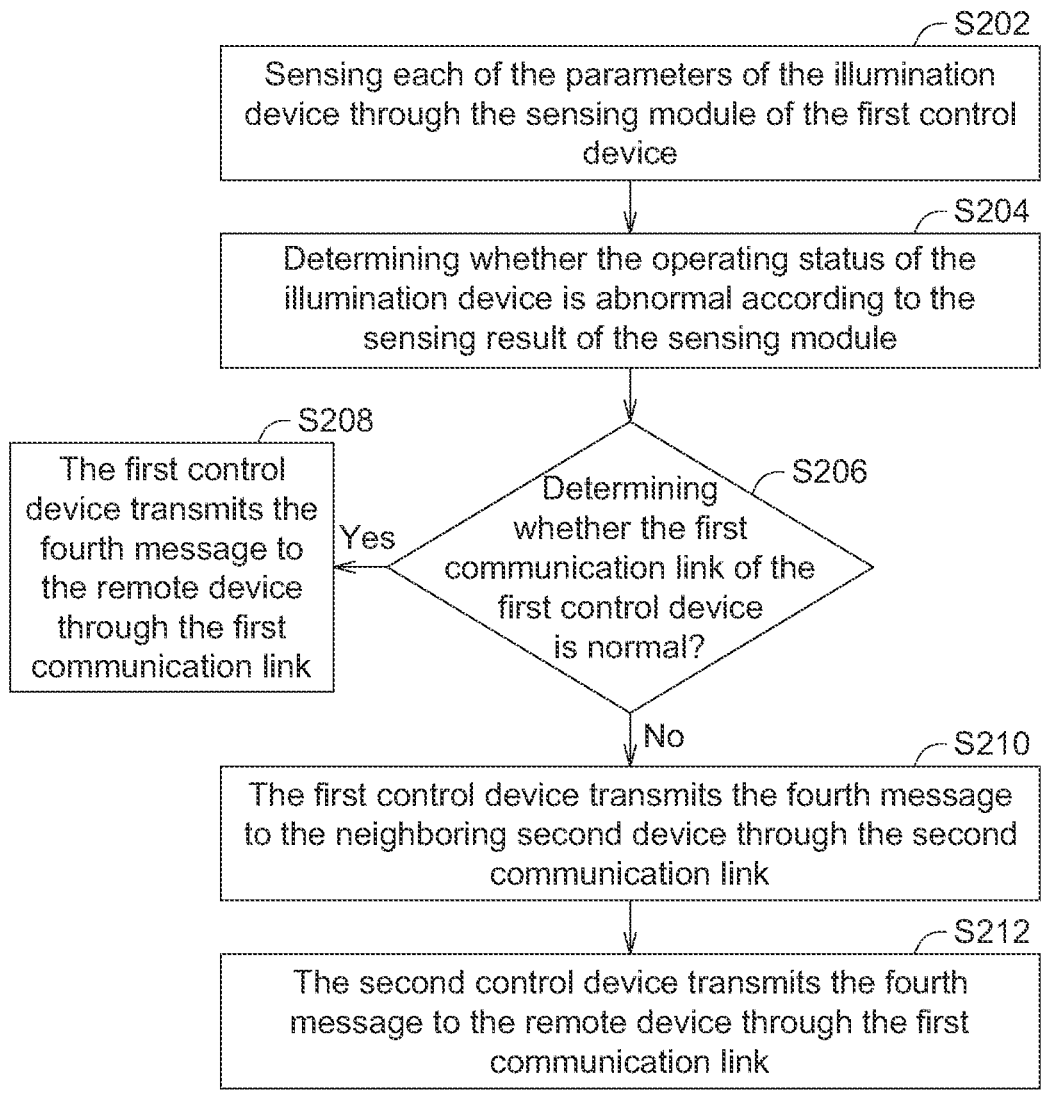
FIG. 6 is a flow chart of another embodiment of the detecting and status reporting method of the disclosure.

FIG. 5 is a schematic diagram illustrating detection and status reporting of the illumination device 110, and FIG. 6 is a flow chart of another embodiment of the detecting and status reporting method of the disclosure. Each step in FIG. 6 may be carried out corresponding to the first control device 100, the illumination device 110 and the second control device 200 of FIG. 5. Please refer to FIGS. 5 and 6, first, in step S202, parameters of the illumination device 110 are sensed by the sensing module 14 of the first control device 100. For example, the sensing module 14 senses parameters such as the brightness, the current, and the power factor of the illumination device 110, to obtain sensing results. Then, in step S204, according to the sensing results of various parameters of the illumination device 110 by the sensing module 14, it is determined whether the operating state of the illumination device 110 is abnormal. For example, when the sensing result by the sensing module 14 indicates that the parameters of the illumination device 110 meet a predefined condition, it is determined that the illumination device 110 is abnormal. In one example, when the sensing result indicates that the brightness of the illumination device 110 is equal to a first brightness, the current of the illumination device 110 is less than a first current value, and the power factor of the illumination device 110 is greater than a first value, it is determined that the illumination device 110 is abnormal. The first brightness is e.g., 100%, the first current value is e.g., 0.05 A, and the first value is e.g., 0.9.

Then, in step 3206, it is determined whether the first communication link C1 of the first control device 100 is normal. If it is determined that the first communication link C1 is normal, step S208 is executed, and the first communication module 11 of the first control device 100 transmits the fourth message M4 to the remote device 500 through the first communication link C1. The fourth message M4 indicates that the illumination device 110 is abnormal, so as to report the abnormal operating status of the illumination device 110 to the remote device 500.

On the other hand, if it is determined in step 3206 that the first communication link C1 is abnormal, it indicates that the first control device 100 may not transmit the fourth message M4 to the remote device 500 through the first communication link C1 to report the status. Then, step 3210 is executed, the second communication module 12 of the first control device 100 transmits the fourth message M4 to the second communication module 22 of the adjacent second control device 200, through the second communication link C2. In an example, the signal strength of the second communication link C2 of the second control device 200 is relatively high, and the second control device 200 is selected as a backup control device.

Then, step S212 is executed to confirm that the first communication link C1 between the second control device 200 and the remote device 500 is normal, and the first communication module 21 of the second control device 200 transmits a fourth message M4 to the remote device 500 through the first communication link C1, so as to report that the illumination device 110 is in an abnormal operating state.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A detecting and status reporting system, comprising:
a first control device, for transmitting a first message to a remote device through a first communication link, and reporting an operating status of the first control device according to the first message, wherein the first communication link has a first communication specification, the first communication specification is LPWAN (Low-Power Wide-Area Network); and
at least one second control device, for communicating with the remote device through the first communication link, and communicating with the first control device through a second communication link, wherein the second communication link has a second communication specification, the second communication specification is LR-WPANs (Low-Rate Wireless Personal Area Networks), and the second communication specification is different from the first communication specification,
wherein, when the first communication link of the first control device is abnormal, the first control device transmits the first message to the at least one second control device through the second communication link, and transmits the first message to the remote device through the first communication link of the at least one second control device to report the operating status of the first control device.

2. The detecting and status reporting system according to claim 1, wherein, after the remote device receives the first message, the remote device transmits a second message to the first control device through the first communication link, if the first control device has not received the second message after a predefined duration, the first communication link of the first control device is determined as abnormal.

3. The detecting and status reporting system according to claim 2, wherein the first control device periodically transmits the first message to the remote device according to a first period, and the predefined duration for receiving the second message is related to the first period.

4. The detecting and status reporting system according to claim 1, wherein, when the first communication link of the first control device is abnormal, the remote device transmits a downlink control command through the first communication link of the at least one second control device to the at least one second control device, and the at least one second control device transmits the downlink control command to the first control device through the second communication link.

5. The detecting and status reporting system according to claim 4, wherein, after the first control device receives the downlink control command, the first control device reboots to recover or re-establish the first communication link of the first control device.

6. The detecting and status reporting system according to claim 1, wherein, the first control device selects at least one backup control device from the at least one second control device when the first communication link of the first control device is abnormal, the first control device transmits the first message to the at least one backup control device through the second communication link, and transmits the first message to the remote device through the first communication link of the at least one backup control device.

7. The detecting and status reporting system according to claim 6, wherein, the first control device selects the at least one backup control device according to a signal strength of the second communication link of the at least one second control device.

8. The detecting and status reporting system according to claim 6, wherein, the first control device and the at least one backup control device transmit a third message to one another through the second communication link, and the first control device checks an operating status of the at least one backup control device according to the third message.

9. The detecting and status reporting system according to claim 1, wherein, each of the first control device and the at least one second control device comprises:
a first communication module, for establishing the first communication link in a first mode, and the first communication specification of the first communication link is "NB-IoT (Narrow Band Internet of Things)" or "CAT-M1"; and
a second communication module, for establishing the second communication link in a second mode, and the second communication specification of the second communication link is "XBEE3 DigiMesh".

10. The detecting and status reporting system according to claim 1, wherein, the first control device is coupled to an illumination device, and the first control device comprises:
a sensing module, for sensing a plurality of parameters of the illumination device,
wherein, when the parameters of the illumination device meet a predefined condition, the illumination device is determined as abnormal.

11. The detecting and status reporting system according to claim 10, wherein, the parameters of the illumination device comprise a brightness, a current or a power factor of the illumination device.

12. The detecting and status reporting system according to claim 11, wherein, when the illumination device is abnormal, the first control device transmits a fourth message to the remote device through the first communication link.

13. A detecting and status reporting method, comprising:
transmitting a first message to a remote device through a first communication link of a first control device, wherein the first communication link has a first communication specification, and the first communication specification is LPWAN (Low-Power Wide-Area Network);
reporting an operating status of the first control device according to the first message;
communicating with the remote device through the first communication link of at least one second control device; and
communicating with the first control device through a second communication link of the at least one second control device, wherein the second communication link has a second communication specification, and the second communication specification is LR-WPANs (Low-Rate Wireless Personal Area Networks), and the second communication specification is different from the first communication specification,
wherein, when the first communication link of the first control device is abnormal, performing the following steps:

transmitting the first message to the at least one second control device through the second communication link of the first control device; and
transmitting the first message to the remote device through the first communication link of the at least one second control device to report the operating status of the first control device.

14. The detecting and status reporting method according to claim 13 further comprising the following steps:
after the remote device receives the first message, transmitting a second message, by the remote device, to the first control device through the first communication link; and
if the first control device has not received the second message after a predetermined duration, determining the first communication link of the first control device as abnormal.

15. The detecting and status reporting method according to claim 14, wherein, the first control device periodically transmits the first message to the remote device according to a first period, and the predefined duration for receiving the second message is related to the first period.

16. The detecting and status reporting method according to claim 13, wherein, when the first communication link of the first control device is abnormal, further performing the following steps:
transmitting a downlink control command, by the remote device, to the at least one second control device through the first communication link of the at least one second control device; and
transmitting the downlink control command, by the at least one second control device, to the first control device through the second communication link.

17. The detecting and status reporting method according to claim 16, wherein, after the first control device receives the downlink control command, the first control device reboots to recover or re-establish the first communication link of the first control device.

18. The detecting and status reporting method according to claim 13, further comprising:
selecting, by the first control device, at least one backup control device from the at least one second control device;
wherein, when the first communication link of the first control device is abnormal, the first control device transmits the first message to the at least one backup control device through the second communication link, and transmits the first message to the remote device through the first communication link of the at least one backup control device.

19. The detecting and status reporting method according to claim 18, wherein, the first control device selects the at least one backup control device according to a signal strength of the second communication link of the at least one second control device.

20. The detecting and status reporting method according to claim 18, further comprising the following steps:
transmitting a third message to one another of the first control device and the at least one backup control device, through the second communication link; and
checking an operating status of the at least one backup control device, by the first control device, according to the third message.

21. The detecting and status reporting method according to claim 13, wherein, each of the first control device and the at least one second control device comprises:

a first communication module, for establishing the first communication link in a first mode, and the first communication specification of the first communication link is "NB-IoT (Narrow Band Internet of Things)" or "CAT-M1"; and a second communication module, for establishing the second communication link in a second mode, and the second communication specification of the second communication link is "XBEE3 DigiMesh".

22. The detecting and status reporting method according to claim 13, wherein, the first control device is coupled to an illumination device, and the first control device comprises:

a sensing module, for sensing a plurality of parameters of the illumination device, wherein, when the parameters of the illumination device meet a predefined condition, the illumination device is determined as abnormal.

23. The detecting and status reporting method according to claim 22, wherein, the parameters of the illumination device comprise a brightness, a current or a power factor of the illumination device.

24. The detecting and status reporting method according to claim 23, wherein, when the illumination device is abnormal, further performing the following steps: transmitting, by the first control device, a fourth message to the remote device through the first communication link.

* * * * *